United States Patent [19]
Browning

[11] 3,980,818
[45] Sept. 14, 1976

[54] RECORDER AND REPRODUCER SYSTEM

[75] Inventor: Iben Browning, Santa Clara, Calif.

[73] Assignee: Sydnor-Barent, Inc., Albuquerque, N. Mex.

[22] Filed: June 27, 1974

[21] Appl. No.: 483,748

Related U.S. Application Data
[63] Continuation of Ser. No. 754,298, Aug. 21, 1968, abandoned.

[52] U.S. Cl. .......................... 178/6.6 R; 178/6.6 B; 178/6.7 A; 179/100.3 G; 179/100.3 V; 340/173 LM; 346/76 L
[51] Int. Cl.² .................. H04N 5/76; G01D 15/14; G11B 7/00
[58] Field of Search ........... 178/6.6 R, 6.7 R, 6.7 A, 178/6.6 B; 340/173 LT, 173 LM; 179/100.3 R, 100.3 G, 100.3 V; 346/76 L, 108

[56] References Cited
UNITED STATES PATENTS

| | | | |
|---|---|---|---|
| 2,283,545 | 5/1942 | Eckert | 179/100.3 G |
| 3,314,073 | 4/1967 | Becker | 346/76 |
| 3,348,233 | 10/1967 | Hertz | 178/6.7 R |
| 3,363,054 | 1/1968 | Mason | 178/6.7 A |

Primary Examiner—Raymond F. Cardillo, Jr.
Attorney, Agent, or Firm—Limbach, Limbach & Sutton

[57] ABSTRACT

A recorder and reproducer system is disclosed wherein video or other information is recorded by modulated laser lattice ablation of an information storage medium on or a part of a record member. A high resolution microscope objective recording head is guided in a direction across the record by a needle tracking groove while a scanning laser beam sweeps the land adjacent the groove in one of a variety of rasters. The high density stored information is read out through the microscope objective by a television type camera or flying spot scanner while the reproducing head traverses the record with high resolution tracking. A lens mosaic is utilized to facilitate high density information storage and a binary ceramic lattic shutter array provides a binary coded address system for identificaton and retrieval of information stored on the record.

3 Claims, 18 Drawing Figures

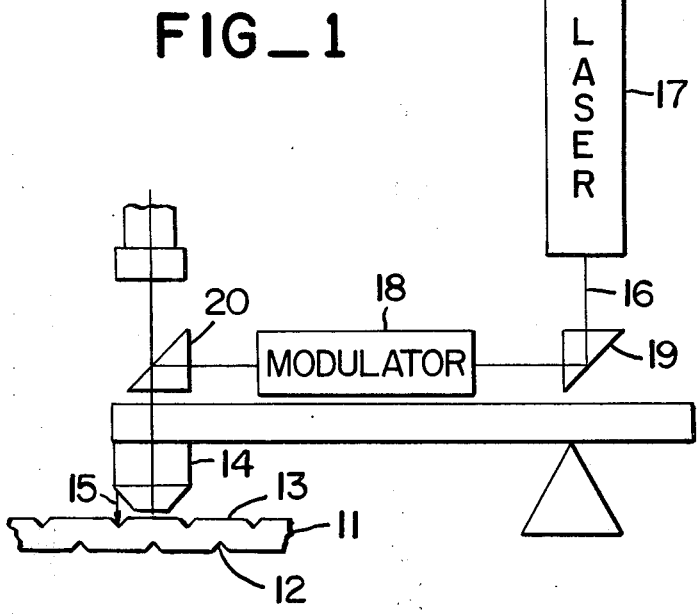
FIG_1
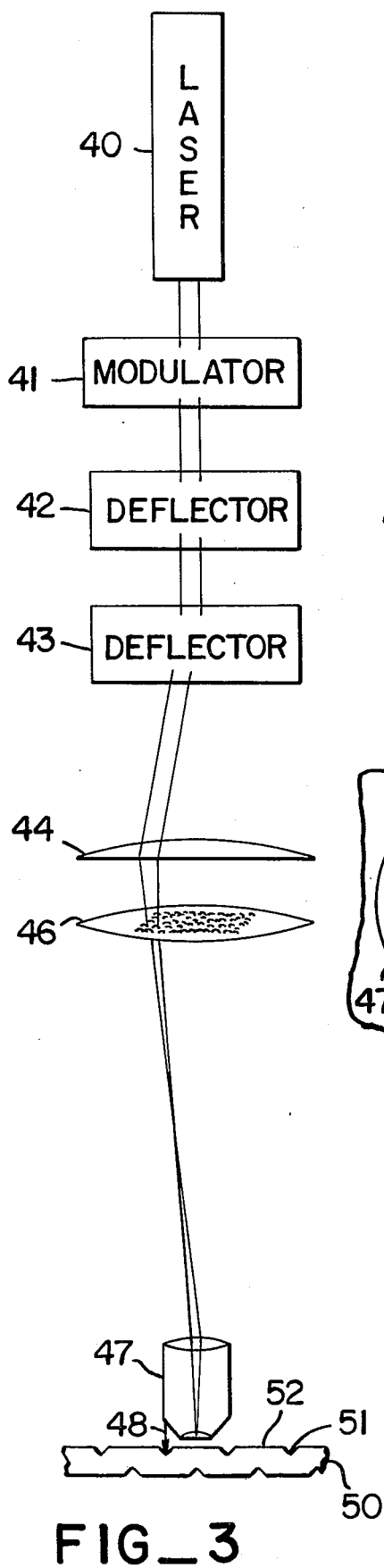
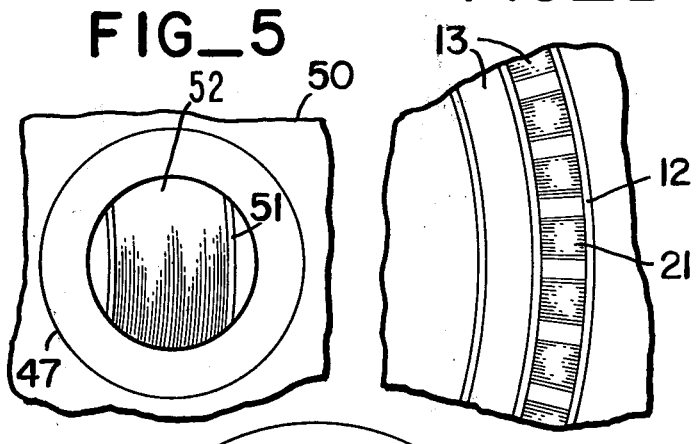
FIG_5
FIG_2
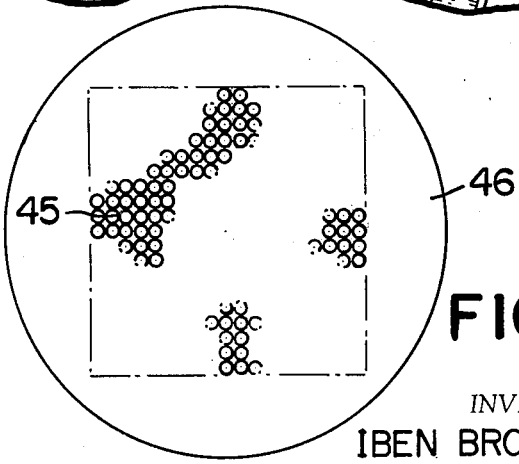
FIG_4
FIG_3
INVENTOR.
IBEN BROWNING
BY
*Limbach and Limbach*
ATTORNEYS

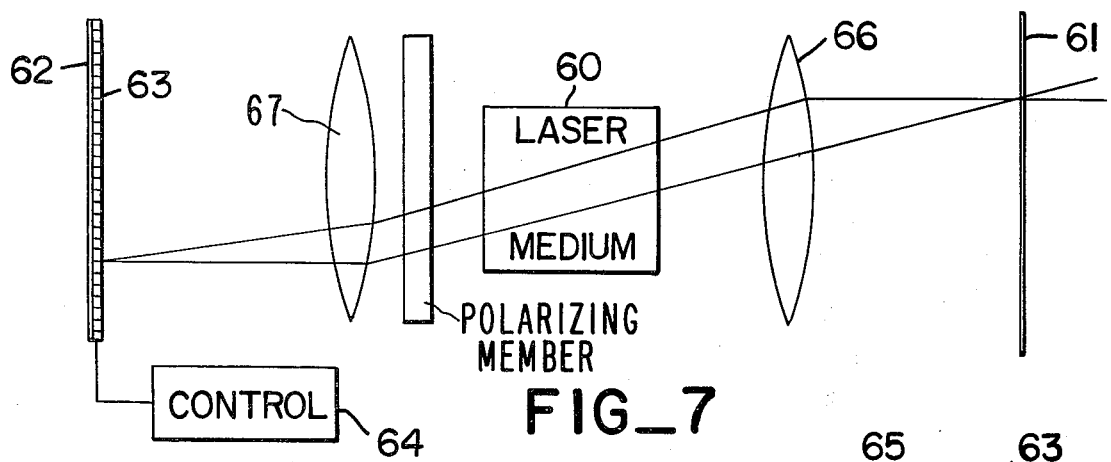
FIG_7
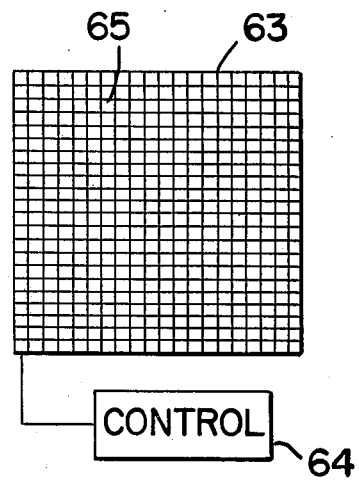
FIG_7a
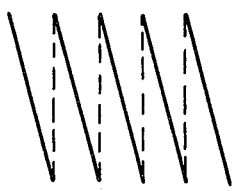
FIG_6a
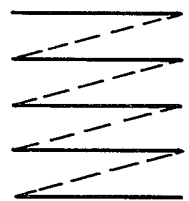
FIG_6b
FIG_8
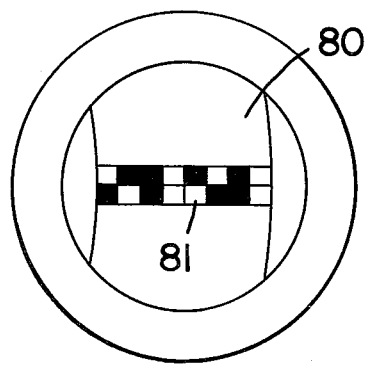
FIG_9
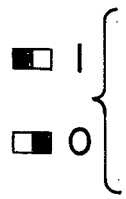
FIG_8a
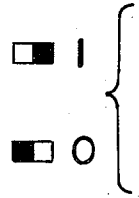
FIG_9a
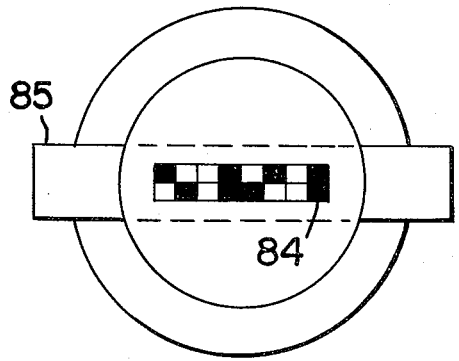
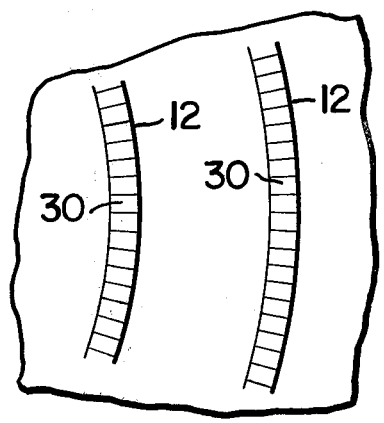
FIG_10
INVENTOR.
IBEN BROWNING
BY
*Limbach and Limbach*
ATTORNEYS

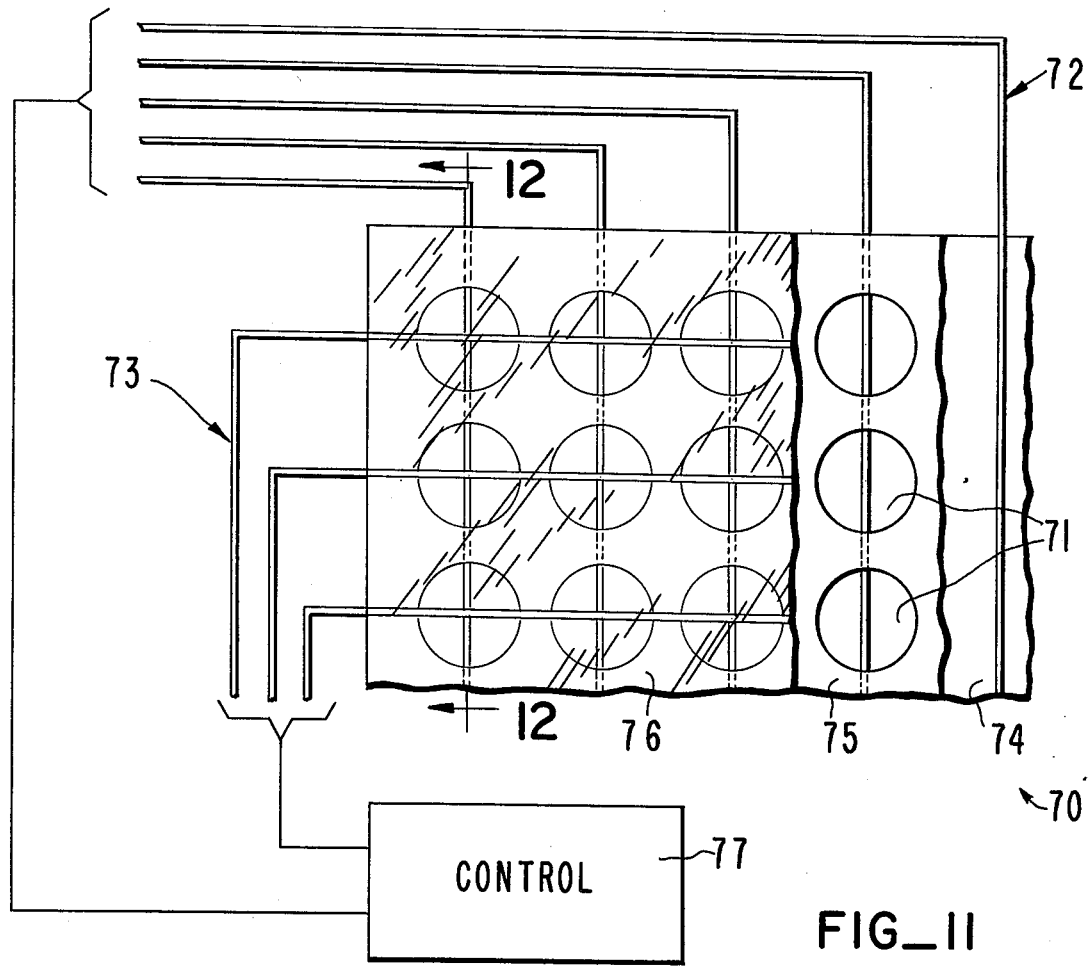
FIG_11
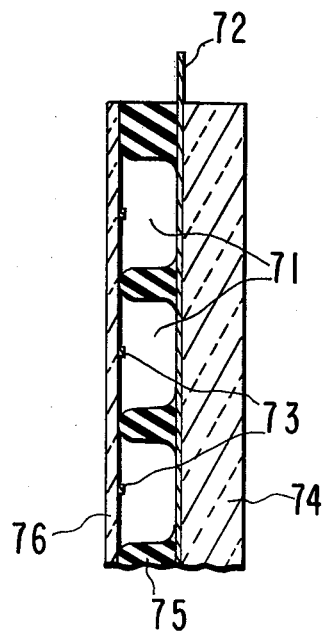
FIG_12
INVENTOR.
IBEN BROWNING
BY *Limbach and Limbach*
ATTORNEYS

FIG_13
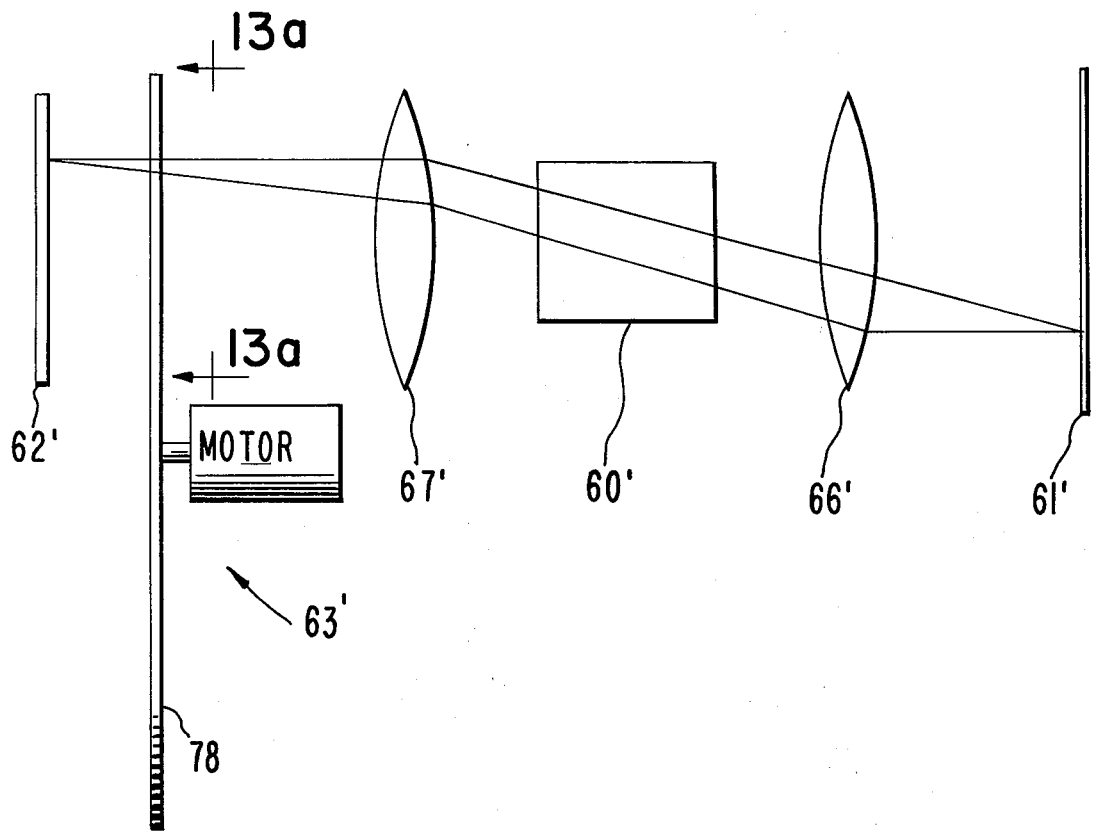
FIG_13a
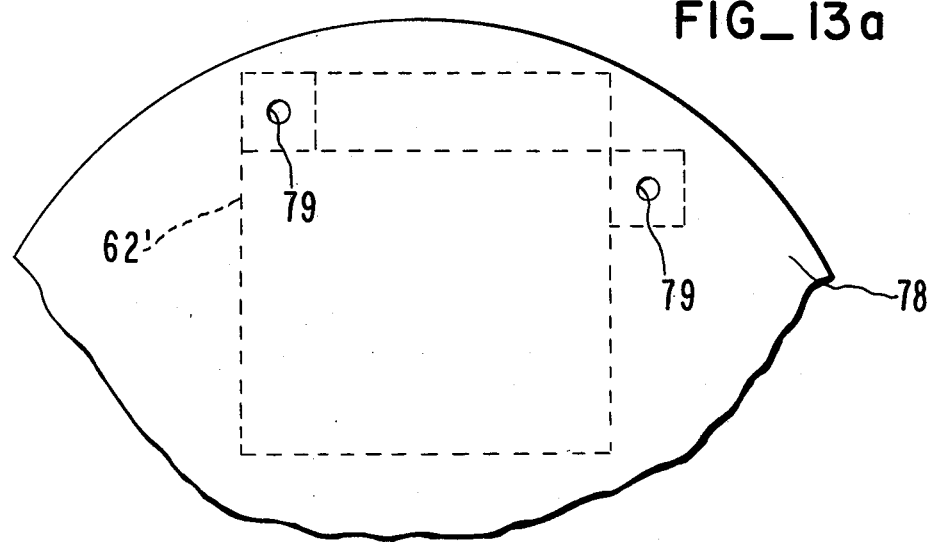

RECORDER AND REPRODUCER SYSTEM

This is a continuation of Ser. No. 754,298 filed Aug. 21, 1968, now abandoned.

This invention relates to a new and improved recorder and reproducer system for storing in an information storage record, video or other information which can be reproduced on a television receiver.

It is an object of the present invention to provide a new and improved method and apparatus for high density storage of high frequency information on an information storage medium in the form of phonograph record type discs and other record configurations such as cylinders, cards and rolls.

Another object of the invention is to provide a readout means for high resolution tracking of the stored high density information to generate a video signal which may be displayed on a television receiver. According to one aspect of this invention, video information for over four hours of television display can be recorded on one side of a standard 12-inch record disc.

A further object of the invention is to provide a scanning laser for recording information on an information storage medium according to one of a variety of possible scanning rasters.

Another object of the invention is to facilitate information retrieval by providing means for identifying and locating information stored at a position on an information storage record. According to this aspect of the invention it is also possible to provide a method and apparatus for high density binary information storage and retrieval from an information storage record. Thus, the present invention is intended to provide a method and apparatus for high density storage and retrieval of information in either analog or digital form.

In order to accomplish these results, the present invention contemplates the provision of an information storage medium in the form of a phonograph record type disc or other record configuration such as a cylinder, card or roll. A precision needle tracking groove is provided on the record for guiding a recording head and fixed tracking needle in a direction across the record. The recording head comprises a high resolution microscope objective accurately positioned by a tracking needle so that the record land between grooves is in the field of view and the focal plane of the microscope objective lens. A modulated laser beam is focused onto the land by the microscope objective and the concentrated laser beam is swept across the land in substantially parallel lines by a vibrating prism or Pockel's cell as the record surface rotates beneath the recording head. The selectively evaporated or ablated streaks on the land may then be provided with a mirror surface and reflective readout of the record information accomplished with a television camera or flying spot scanner focused through the microscope objective to traverse along the record land. Light reflected from relatively flat portions of the land is picked up by the microscope objective while light reflected from ablated portions of the land is scattered and partially lost providing a reflected beam of modulated intensity corresponding to the information stored in the record. Detection of the reflected readout may be accomplished with a photo-transducer to generate a video signal. The needle tracking groove is smooth and uniform containing no primary information, and accurately positions the microscope objective for readout of the stored information. A high resolution microscope objective lens is utilized to resolve the high density stored information. Initial information storage may take place on a disc of metal or other suitable material for providing a master from which copies may be stamped or otherwise reproduced.

According to another aspect of the invention, a scanning laser is provided capable of scanning a planar area with a concentrated laser beam. One embodiment of the scanning laser comprises a lasing medium within a flat field Fabray-Perot resonator one of whose retroreflectors is a dielectric mirror coating on a ceramic lattice shutter array formed of a plate of ferroelectric ceramic material having an anisotropic optical response when polarized and a plurality of electrodes across the plate for selectively applying external electric polarizing fields to localized regions of the plate. Localized portions of the plate may be either substantially transparent or substantially opaque depending upon the polarization state of the localized region of the ceramic plate. The resonant modes of the laser and the Q of the resonator may be controlled by the polarization of the ceramic material to provide a scanning laser. Other scanning lasers are also described.

According to another aspect of the invention, the scanning laser beam is focused by a field lens through a lens mosaic eyepiece comprised of a plurality of tiny lenses in a planar array. The laser beam sequentially scans the microlenses of the lens mosaic according to a predetermined raster and the transmitted light is focused by the microscope objective to selectively evaporate or ablate the information storage medium and form a raster of streaks of spots on the record disc land. The lens mosaic eyepiece is oriented at an angle with respect to the record disc land so that the streak of spots formed by any particular lens of the lens mosaic as the record disc advances beneath the microscope objective, is non-overlapping with the streak of spots produced by any other lens in the lens mosaic. The stored information may be read out by a television camera or flying spot camera tracking the raster of the laser beam as the record advances beneath the microscope objective.

The invention also contemplates providing a binary code for identifying the location of information stored on the record disc thereby facilitating information location and retrieval.

According to this aspect of the invention, a binary shutter array is appropriately interposed in the recording laser beam at either the beginning or the end of video information stored in the manner described above. The binary shutter array is formed of a plate of ferroelectric ceramic material having an anisotropic optical response when polarized and a plurality of electrodes across the plate for selectively polarizing localized regions of the plate. Thus, a binary coded sequency may be evaporated or ablated on the land adjacent the identified stored information. For information retrieval, the binary shutter array would be used as an optical comparator to generate a signal upon a positive comparison between a binary coded sequence on the land and a particular shutter configuration of the binary shutter array through the microscope objective as the record disc passes beneath the microscope objective. The binary ceramic lattice shutter array may itself be used to store binary information in digital form in frames along the record disc land.

Besides the shutter array described in the last preceding paragraph, another aspect of the present invention includes provision for a shutter array formed of an interference filter matrix. The shutter array in accordance with this aspect of the present invention includes provision of a matrix of optical cavity resonators and means for changing the resonance of appropriate cavities to change the absorption of such cavities.

In addition to the binary coded word address for locating and retrieving information, the present invention also contemplates utilizing a word address comprising a single scan of the scanning laser raster through a single row of microlenses in the lens mosaic eyepiece at a point on the record disc land adjacent the identified or addressed information.

Other objects, features and advantages of the present invention will become apparent in the following specification and accompanying drawings.

FIG. 1 is a diagrammatic view of a laser video disc recorder embodying the present invention.

FIG. 2 is a diagrammatic fragmentary plan view of a portion of the record disc showing radial recording lines across the land between grooves.

FIG. 3 is a diagrammatic view of another laser disc recorder embodied in the present invention.

FIG. 4 is a detailed plan view of the lens mosaic eyepiece of the apparatus illustrated in FIG. 3.

FIG. 5 is a detailed diagrammatic view of the portion of land between grooves on the record disc in the objective field of the microscope objective.

FIG. 6a and 6b are diagrammatic representations of scanning raster patterns for the scanning laser.

FIG. 7 is a diagrammatic view of a scanning laser embodying the present invention.

FIG. 7a is a diagrammatic plane view of the ferroelectric ceramic lattice shutter array.

FIG. 8 is a detailed diagrammatic view through the microscope objective of the record disc land showing a binary coded address for information location and retrieval.

FIG. 8a is a diagrammatic representation of the binary bits used in recording the identifying address in the record disc land.

FIG. 9 is a detailed diagrammatic view of a binary shutter array and photocell detector viewed from the record disc surface through the microscope objective in an upward direction for locating and identifying the binary coded address illustrated in FIG. 8.

FIG. 9a is diagrammatic representation of the binary bits programmed in the binary shutter array for locating and identifying a binary coded word address recorded on the record disc land as in FIG. 8.

FIG. 10 is a fragmentary diagrammatic view of a portion of the record disc showing one means for regulating the angular velocity of the rotating record disc to provide a constant surface of velocity of the record disc with respect to the microscope objective and tracking needle.

FIG. 11 is an enlarged plan view, partially broken away, of a portion of an interference filter in accordance with one aspect of this invention.

FIG. 12 is a cross-sectional view of the structure illustrated in FIG. 11 taken along line 12—12 in the direction of the arrows.

FIG. 13 is a view similar to FIG. 7 illustrating another embodiment of the present invention.

FIG. 13a is an enlarged view of a portion of the structure shown in FIG. 13 taken along the line 13a—13a.

In the embodiment of the present invention illustrated in FIG. 1 there is provided an energy-absorbing information storage medium or a reproduced copy therefrom formed into a record disc 11 having formed thereon on each side a smooth, precision, helical needle tracking groove 12 for guiding a recorder and readout head in a radial direction across the disc upon rotation of the disc. The flat spiral land 13 intermediate and adjacent the groove 12 provides the information storage site. Initial information storage may take place on a disc of metal or other material suitable for providing a master from which copies may be stamped or otherwise reproduced. The recording and readout head 14 comprises a microscope objective and a tracking needle 15 securely fixed thereto for accurately positioning the microscope objective over the land 13 so that the land lies within the focal plane and field of view of the microscope objective lens.

Information such as video information is recorded on the land 13 intermediate the helical tracking groove 12 by a laser beam 16 generated by a continuous wave laser 17 and modulated with the video informatin by modulator 18 which may comprise, for example, an electro-optic Kerr cell. The laser light beam is directed by a prism 19 on the recording arm through the modulator 18 to a deflector prism 20 and is focused by the microscope objective lens onto the land 13 of the record disc. As the record disc passes beneath the microscope objective lens, the focused modulated laser beam is deflected in radial scanning lines 21 along the land 13 between the helical tracking groove 12 as illustrated in FIG. 2. The scanning laser beam selectively evaporates or ablates the information storage medium in radial streaks according to the modulating signal. A vibrating prism or an electro-optic Pockel's cell may be used, by way of example, for deflecting the laser beam to produce the radial streaks.

For readout of the stored information, the record disc with information stored thereon may be provided with a mirrored surface. Reflective readout may be accomplished with a television camera or flying spot scanner to generate the original video signal from a photocell detector or other photosensitive transducer. Illumination and readout of the stored information may be accomplished through a half silvered mirror. Light is reflected from the land to the microscope objective for readout with varying intensity. Light reflected from relatively flat portions of the land is picked up by the microscope objective while light reflected from ablated portions of the land is scattered and partially misses the objective providing a reflected beam modulated in intensity according to the stored information. Accurate andd high resolution readout of the stored information is made possible by precision needle tracking and a high resolution objective lens such as a 44X acnromatic microscope objective. For accurate placement of the microscope objective with respect to the land of the record disc, a tracking needle having a diameter of 0.003 inches and a smooth helical tracking groove of corresponding width may be provided, by way of example.

During recording by laser beam ablation of the record material a film of transparent material such as ¼ mil mylar or 1 mil glass plate in the form of a rolled strip may be passed between the microscope objective lens and record surface to pick up and dispose of sputtered products from the record surface thereby protecting the lens.

By using a high resolution microscope objective lens and precision needle tracking, extremely high density video information in a band width of 6 magacycles may be recorded and read out. By way of example, if a standard 12-inch record were utilized, approximately 4¼ inches of the outer radius of the disc would be available for information storage. A 44X achromatic microscope objective lens can resolve a dimension of at least $2 \times 10^{-5}$ inches. For a band width of 6 megacycles, assuming 600 continuous sweeps per picture along the land recording at a rate of 30 pictures per second, there would be approximately 333 cycles per sweep of the laser beam across the land, each cycle containing two bits of information. At a resolution of $2 \times 10^{-5}$ inches by the microscope objective lens, approximately 0.013 inches of information storage medium would be allocated per sweep across the land. Thus, the land would be formed to have a width of approximately 0.013 inches. Using a needle and tracking groove of 0.003 inches diameter, the width of each land and groove set would be approximately 0.016 inches thereby providing approximately 60 land and groove sets per inch of radius. The approximately 5,705 total inches of the helical land and groove with 50,000 scanning sweeps per inch would thereby provide almost 4¼ hours of video playback on each side of the 12-inch record disc. For reading out the stored information with a television camera, the recorded information is illuminated and the television camera is provided with a repeating horizontal scan line which scans the record disc land again and agin as the record passes under the microscope objective lens. Alternatively, readout may be accomplished with a flying spot scanner such as an oscilloscope imaged down through the objective lens. A beam splitter and photodetector are utilized for generating a signal from the reflective readout produced by the flying spot scanner. The record surface may be mirrored for optical efficiency. The ultimate limit of information density depends upon the resolution of the microscope objective lens.

As the recording and readout head traverses across the rotating record disc in a radial direction, the velocity of the microscope objective with respect to the record surface will continuously decrease for a constant angular velocity of the rotating record disc. It is therefore advantageous to provide means for providing a constant relative velocity between the microscope objective and the record disc surface passing beneath it. This may be accomplished by allocating a portion of the land to information for regulating the record rotation rate. Thus, a strip approximately 0.003 inches wide along the 0.013 inch wide land may be allocated to a helical sequence of equally spaced slits or bits whose constant spacing is utilized to maintain a constant speed of the record surface relative to the microscope objective. Thus, as the microscope objective traverses the record disc with the land in its field of view, the strip of spaced bits will provide a frequency of flicker for adjusting the record rotation rate to provide a constant speed. Thus, as illustrated in FIG. 10, the spacing between bits 30 remains constant as the microscope objective lens approaches the center of the record disc in a radial direction. A 0.010 width of the land is still available for recording primary video information.

In the embodiment of the present invention illustrated in FIG. 3, there is provided a scanning laser beam, capable of scanning a planar area. The laser beam from the continuous wave laser medium 40 is modulated with the video information by modulator 41. The modulated laser beam may be deflected in two dimensions across a planar area by first and second electro-optic Pockel's cell deflectors 42 and 43 such as those described in the article, "Electro Optic Light Beam Deflection" by Lotspich, appearing in the I.E.E.E. Spectrum, February 1968, page 45. The two deflectors provide components of deflection of the light beam in two dimensions across a planar area. The modulated and deflected laser beam is focused through a field lens 44 onto one of the microlenes 45 of a lens mosaic eyepiece 46. The lens mosaic is formed as described in my U.S. Pat. No. 3,267,826, issued on Aug. 23, 1966, and is comprised of a multitude of tiny lenses in a closely packed array as illustrated in FIG. 4. As shown in that figure, by way of example, the eyepiece comprises a lens mosaic of 20 rows and 20 columns of microlenses in a planar area. The modulated laser beam is deflected to sequentially scan the rows or columns of the lens mosaic eyepiece 46. As used hereinafter, "rows" refers to columns or rows. As the laser beam sequentially strikes each microlens of the lens mosaic. The modulated laser beam is transmitted through and focused by the microlens of the lens mosaic and directed onto a microscope objective lens 47. A tracking needle 48 is affixed to the microscope objective lens 47 so that the objective lens traverses the record disc 50 in a radial direction guided by the precision helical needle tracking groove 51 formed on the record disc.

The microscope objective lens 47 focuses the modulated laser beam onto the land 52 to selectively evaporate or ablate the record disc medium according to the modulated signal and the scanning raster.

The field lens 44 is chosen to image the beam on the back of the upper lens element of the microscope objective 47. The focal length of each of the microlenses of the lens mosaic 46 is chosen so that no part of the divergent cone of laser light misses the upper lens element of the microscope objective lens 47. Thus, a plane of focus of the microlenses 45 comprising the lens mosaic would fall intermediate the eyepiece 46 and the microscope objective lens 47. For a standard microscope objective lens, this intermediate plane of focus would fall approximately 160 millimeters above the microscope objective lens.

Utilizing the lens mosaic eyepiece 46 illustrated in FIG. 4 with the laser beam sequentially scanning the rows of microlenses 45 comprising the lens mosaic, streaks of spots will be formed on the record disc land by the focused laser beam. The lens mosaic is oriented at a slight angle with respect to the direction of motion of the record disc land beneath the microscope objective so that the streak of spots produced by any one microlens 45 of the lens mosaic 46 as the laser beam sequentially scans that microlens, produces a streak of spots substantially not overlapping with the streak of spots produced by any other microlens of the lens mosaic. Thus, as illustrated diagrammatically in FIG. 5, an array of staggered streaks of evaporated or ablated spots would be formed in the record land 52 between the helical tracking groove 51. The scanning raster producing such a stored information configuration is shown diagrammatically in FIG. 6a wherein the solid diagonal line represents a scanning line along a column of microlenses oriented at a slight angle with respect to the direction of motion of the record land beneath the microscope objective and the dotted line represents the recovery for the second scan line. Other scanning rasters such as that illustrated in FIG. 6b may also be used with the lens mosaic eyepiece suitably oriented with respect to the record disc land. The diagrammatic objective field illustrated in FIG. 5 shows the beginning of the streaks of stored information produced by the scanning raster of FIG. 6a.

The record disc with information stored thereon may be provided with a mirrored surface. Reflective readout of the stored information may be accomplished with a television camera in which the stored information is illuminated and particular points scanned by the image orthicon. Alternatively, a flying spot scanner may be used for reflective readout, in which case the entire field is monitored by a photosensitive transducer such as a photomultiplier tube and particular points illuminated by the flying spot scanner. The read-out scanning raster could be by way of example those illustrated in FIG. 6a and 6b depending upon the scanning raster utilized in storing the information. Reflective readout of the stored information takes place through the microscope objective lens as the objective traverses across the record disc in a radial direction guided by the precision helical tracking groove. The reflective signal may be directed to a photosensitive transducer such as a photomultiplier tube by a beam splitter. As in storing the information, reflective readout would require a high resolution objective lens such as a 10X achromatic microscopic objective or a 44X achromatic objective lens.

While the invention has been described as typically applicable to recording and reproducing analog information, a true image can also be recorded and reproduced from the lands 13 of the disc 11. As with analog recording and reproduction described above, the image information can be read by illuminating everything in the field of the objective and looking at points therein, illuminating points in the field and looking at everything or illuminating and looking at everything in the field of the objective.

In order to provide a scanning laser beam for storing information in a planar area according to a predetermined scanning raster, laser beam deflecting means other than that disclosed in the embodiment of the invention illustrated in FIG. 3, may also be provided. Thus, the scanning laser described in the article "The Electron Beam Scanlaser: Theoretical and Operational Studies" by Myers and Pole, published in the IMB Journal, September 1967, at page 502, may also be used.

Another scanning laser is illustrated in FIG. 7. According to this aspect of the present invention, a continuous wave laser medium 60 is provided within a Fabry-Perot resonant cavity. The retroreflectors of the Fabry-Perot resonant cavity are formed by a half silvered mirror 61 which transmits the scanning laser output, and a dielectric mirror coating 62. The dielectric mirror coating 62 is coated on the back surface of a ferroelectric ceramic material having an anisotropic optical response under polarization and a plurality of electrodes across the plate for applying electric polarizing fields to localize regions of the plate. Such a ceramic material is, by way of example, hot-pressed lead zirconate-lead titanate. When formed as a coarse grained (over two microns) polycrystalline material, the ceramic is substantially transparent when polarized normal to the major surface to which light is incident. On the other hand, when polarized parallel to the major surface to which light is incident, the ceramic is substantially opaque to light which is polarized at 90° from the direction of polarization of the ceramic. Thus, the ferroelectric ceramic lattice shutter array 63 may be utilized as a mode selector for determining the resonant modes of the lasing medium 60. By means of the electrodes formed across the ceramic plate and control means 64, highly localized regions 65 of the ceramic plate may be rendered either substantially transparent or substantially opaque to the incident polarized laser beam.

On either side of the laser medium 60, lenses 66 and 67 focus the laser beam onto the flat-field retroreflecting mirrors 61 and 62. The flat-field mirrors 61 and 62 are positioned in the focal planes respectively of lenses 66 and 67.

By means of the ferroelectric ceramic lattice shutter array 63, the Q of the resonant cavity between reflectors 61 and 62 is spoiled except at a localized region determined by control means 64. The localized region of high Q may then be scanned across the ferroelectric ceramic shutter array according to a predetermined scanning raster by control means 64 so that the resonant modes of the laser medium follow the scanning raster producing a concentrated scanning laser beam output at the half silvered mirror 61. The retroreflecting mirror 62, if coated on the ferroelectric ceramic plate 63, must be a dielectric material in order not to interfere with the polarization of the ceramic by electrical short circuiting. If a metallic reflector is used it must be carefully insulated from the ceramic plate by a transparent dielectric material.

In another form of the scanning laser, the ferroelectric ceramic material described above may be in a fine-grained (under two microns) polycrystalline form. In that event, the polycrystalline fine-grained ceramic provides varying degrees of transparency and opacity to plane polarized light depending upon the direction of polarization of polycrystalline ceramic material with respect to the direction of plane polarization of the incident light. In the scanning laser illustrated in FIG. 7, the laser medium would be provided with Brewster angle windows to produce a plane polarized laser beam. Localized regions of the ferroelectric ceramic lattice shutter array may be sequentially rendered transparent to the incident laser beam to provide a localized high Q. The Q across the rest of the plate may be spoiled by polarizing the ceramic material in a direction to render it substantially opaque to the incident laser beam. Thus, the resonant modes of the lasing medium would again be controlled by the scanning raster of the ferroelectric plate according to the control means 64 thereby producing a scanning laser beam at the output mirror 61.

Another type of scanning laser may be provided by placing an interference filter matrix at the output mirror of the resonant laser cavity to absorb the laser light across the output mirror except at a predetermined point which may be scanned sequentially across the output mirror in a predetermined raster to provide a scanning laser beam. The interference filter matrix by absorbing light across the output mirror, spoils the Q except at a predetermined point, thereby controlling the resonant modes of the laser medium.

Such an interference filter 70 as illustrated in FIGS. 11 and 12 can include a matrix of optical cavity resonators 71 formed in the member which can be positioned in the optical path in a laser cavity and can serve as one of the reflecting mirrors for the laser cavity as mirror 62 in FIG. 6. The filter 70 includes two conductor arrays 72 and 73 each made up of a plurality of parallel conductors and with the conductors of the two arrays contained in spaced apart planes with the conductors in one plane arranged at an angle with respect to those in the other plane so that a normal projection of the conductors of one array onto the plane of the other array provides intersection of each conductor of each array with substantially all of the conductors of the other array. With a cavity resonator 71 established at each such projected intersection, a capacitive gap is established by a pair of conductors for each resonator and the resonance of each particular cavity controlled by an electrostatic force applied between the two particular conductors from a control assembly schematically designated 77.

In the embodiment illustrated, the interference filter 70 includes a base support member 74, either itself or one of its surfaces being half silvered for partial transmission. One of the conductor arrays 72 is provided, such as by vapor deposition on one surface of the support member 74 and an opaque, dielectric spacing grillwork 75 is provided on top of the conductor array 72 to define the sidewalls, shown here as substantially cylindrical, of the cavity resonators 71. The grillwork 75 is arranged to provide the cavity resonators 71 in columns along the respective conductors of conductor array 72. A flexible membrane 76 is provided on top of the grillwork 75 to close the open ends of the cavity resonators 71 with a conductor array 73 provided on the membrane 76 aligned over the cavity resonators 71 to provide each conductor centered over a row of cavity resonators 71. This membrane is partially transmitting such as by a half silvered mirror surface provided on one surface thereof. When the spacing between reflecting surfaces of the cavity resonators 71 of interference filter 70 is one-quarter wavelength for the wavelength of the operating light, the cavity resonators 71 serve to absorb light directed thereon. By applying appropriate charge to separate conductors of the two arrays 72 and 73, the membrane 76 located at the cavity resonator 71 where the projection of these two conductors intersect can be deformed either to provide a resonant trap for dissipating incident light or a non-interacting element for transmitting light or reflecting light back to the lasing medium depending upon the spacing. The interference filter matrix described above may be formed either on the partially silvered output mirror of the laser cavity or the back mirror of the laser cavity and either one or two flexible membranes utilized for each cavity. One advantage of this interference filter resides in the fact that upon removal of the electrostatic force between two particular conductors the cavity resonator controlled thereby returns to its state of existence prior to application of the electrostatic force. The conductor arrays 72 and 73 can actually be formed by parallel mirrored band portions on the respective elements of the interference filter, a deposited metal film serving as both partial reflector and electrical conductor.

Another form of scanning laser is constructed utilizing a plate of commercially available dielectric material which is transparent under polarization but which returns to an opaque state when the polarizing electrostatic field is removed. Such a plate of dielectric material provided with a two-dimension network of electrodes of transparent electrically conducting material in the manner described above for the interference filter may be positioned adjacent the retroreflector of a laser resonant cavity to control the resonant modes and provide a scanning laser beam output.

Still another scanning laser, shown in FIGS. 13 and 13a, takes the form of a laser cavity of the type generally shown in FIG. 7 with lasing medium 60', reflecting mirrors 61' and 62', and lenses 66' and 67'. In this embodiment of the invention, the shutter array 63' takes the form of a disc 78 rotated in the cavity between the lasing medium and one mirror and with a series of spaced apart apertures 79 helically arranged on the disc 78. The size of the apertures 79 and their spacing is arranged such that upon rotation of the disc each of the apertures 79 scans an arc across the mirror with the arcs parallel and non-overlapping and only one aperture scanning at a time such that light focused through an aperture by the cavity lenses is caused to sweep across the mirror to sequentially scan all different areas of the mirror.

Each of the scanning lasers described herein has a variety of uses in addition to application in the present invention. Thus, the scanning lasers may be utilized in milling machines and machine tooling, and in a variety of information reproducing systems.

Each of the above-described scanning lasers may be incorporated in the laser recording apparatus illustrated in FIG. 3 so that the field lens 44 directs the scanning laser beam output through the lens mosaic eyepiece 46 as described above.

The present invention also provides means for facilitating location and retrieval of information stored in a record disc according to the above description. According to this aspect of the invention, a binary coded address is associated with each recorded document or portion of recorded information on the record disc land. The record address appearing on the record disc land adjacent the identified information may be formed of a combination of binary bits as illustrated in FIG. 8a producing an array of rows of such bits on the land as illustrated diagrammatically in the objective lens field of FIG. 8. Such as address may be formed on the record disc land by focusing the laser beam through a binary ceramic lattice shutter array such as described above and in my U.S. patent application Ser. No. 708,061 filed on Feb. 26, 1968, entitled "OPTICAL MEMORY". Location and identification of the binary coded address may be accomplished through the microscopic objective lens as it scans the record disc lands by optical comparison of the programmed ceramic lattice shutter array with the illuminated recorded address. As illustrated in FIG. 9, the ceramic lattice shutter array 84 is programmed with the binary code illustrated in FIG. 9a in order to locate a desired address. A photosensitive transducer such as a photomultiplier tube 85 is positioned behind the ceramic lattice shutter array 84 which provides a window for comparison with illuminated addresses on the record disc land. When the address illustrated in the microscopic objective field of FIG. 8 falls beneath the ceramic lattice shutter array is programmed in FIG. 9, the output of the photomultiplier tube 85 falls to zero or to a minimum thereby indicating address location and identification. The negative signal from the photomultiplier tube may be utilized to control subsequent readout of the located information.

The binary coded information storage and retrieval technique described above may be utilized not only for providing means for addressing stored information, but may also be utilized generally for storing binary coded information on the record disc lands. Thus, the entire record disc land may be evaporated or ablated with successive frames of binary coded information. Furthermore, the binary coded informatin may be stored on the record disc lands in successive frames at extremely high density information storage in the manner set forth in my U.S. patent application entitled 37 OPTICAL MEMORY" referred to above.

Identifying and locating information stored on the record disc may also be accomplished by utilizing a single row of microlenses of the lens mosaic eyepiece as a memory word address. Thus, a single row of streaks ablated in the record disc land from a single scan line of the laser beam along a row of microlenses in the lens mosaic may be utilized as an address for locating and identifying adjacent information stored in the record disc land.

Although the embodiments of the invention described herein have utilized only phonograph record type discs, it is apparent that other types of record configurations such as cylinders, cards, or rolls could also be utilized with appropriate modifications as would be apparent to one skilled in the art. It is apparent that relative motion between the recording and reproducing head and the record may be accomplished by motion of the head or motion of the record, or both.

What is claimed is:

1. A disc recorder and reproducer system comprising: a record disc including an energy absorbing information storage medium and having formed on at least one side thereof a helical needle tracking groove and land intermediate and adjacent the groove; objective lens means having a tracking needle securely affixed thereto adapted to follow the helical needle tracking groove of the record disc and position the objective lens with respect to record disc so that the land lies within the focal plane and field of view of the objective lens; means generating a coherent light beam and means directing said coherent light beam onto said objective lens means; and binary coded shutter array means interposed in the path of the generated beam of coherent light whereby the coherent light beam is selectively transmitted through said binary coded shutter array and focused by said objective lens means onto the record disc land to selectively ablate the record disc land and store binary coded information.

2. A recorder and reproducer system comprising: a record including an information storage medium having formed on at least one side thereof a needle tracking groove and a land adjacent the needle tracking groove; a high resolution objective lens means having a tracking needle securely fixed thereto adapted to follow the needle tracking groove of the record and position the objective lens means over the record land so that a portion of the record between adjacent grooves lies within the focal plane and field of view of the objective lens means; means generating a beam of light and means for directing the beam of light through said objective means; modulating means for modulating the beam of light; means providing relative motion between the record and tracking needle whereby stored information is selectively produced; and means to regulate the relative motion of said record and said tracking needle comprising a row of equally spaced slots formed in the record land adjacent the needle tracking groove.

3. A recorder and reproducer system comprising: a record including an information storage medium having formed on at least one side thereof a needle tracking groove and a land adjacent the needle tracking groove; a high resolution objective lens means having a tracking needle securely fixed thereto adapted to follow the needle tracking groove of the record and position the objective lens means over the record land so that a portion of the record between adjacent grooves lies within the focal plane and field of view of the objective lens means; means generating a beam of light and means for directing the beam of light through said objective means; modulating means for modulating the beam of light; means providing relative motion between the record and tracking needle whereby stored information is selectively produced; and an address system comprising: a coded shutter array comprising a plate of ferroelectric ceramic material having an anisotropic response when polarized and a plurality of electrodes across the plate for applying electric polarizing fields to localized regions of the plate, said coded shutter array being adapted to be positioned in the path of said beam of light whereby light transmitted through said shutter array is focused by an objective lens means to produce information on the record lands.

* * * * *

UNITED STATES PATENT AND TRADEMARK OFFICE
CERTIFICATE OF CORRECTION

PATENT NO. : 3,980,818
DATED : Sept. 14, 1976
INVENTOR(S) : Iben Browning

It is certified that error appears in the above-identified patent and that said Letters Patent are hereby corrected as shown below:

In the Abstract:

Line 3, "lattice" should be --beam--;

Line 14, correct the spelling of "lattice".

Column 2, lines 57 and 58, "sequency" should be --sequence--.

Column 4, line 22, correct the spelling of "information";

line 53, correct the spelling of "and";

line 55, correct the spelling of "achromatic".

Column 5, line 3, correct the spelling of "megacycles";

line 25, "4-1/4" should be --4-1/2--;

line 31, correct the spelling of "again".

Column 6, line 23, change the period to a comma and "The" to --the--.

Column 10, line 42, "as" should be --an--.

Column 11, line 6, correct spelling of "information";

line 9, delete "37" and insert therefor --"--;

Signed and Sealed this

Fifteenth Day of March 1977

[SEAL]

Attest:

RUTH C. MASON
*Attesting Officer*

C. MARSHALL DANN
*Commissioner of Patents and Trademarks*